United States Patent Office 2,934,538
Patented Apr. 26, 1960

2,934,538

BIS QUATERNARY AMMONIUM COMPOUNDS OF BETA AMINO ETHYL β'-AMINO-α-METHYLPROPIONATES

Renat H. Mizzoni, Chester, N.J., assignor to Ciba Pharmaceutical Products, Inc., Summit, N.J., a corporation of New Jersey No Drawing. Application September 3, 1954
Serial No. 454,210

6 Claims. (Cl. 260—294.3)

This invention relates to therapeutically useful quaternary ammonium compounds of β-Am-ethyl β-Am'-α-methylpropionates, wherein one of the amino groups Am and Am' stands for a lower dialkyl amino group or an amino group the N-atom of which is part of a saturated monocyclic heterocyclic ring, and the other stands for an amino group the N-atom of which is part of a saturated monocyclic heterocyclic ring.

More particularly the invention relates to di-lower alkyl ammonium compounds of β-Am-ethyl β-Am'-α-methylpropionates of the formula

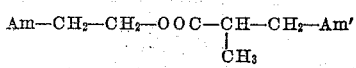

wherein Am and Am' have the above indicated meanings, and especially of those propionates in which one of the amino groups Am and Am' stands for dimethylamino, diethylamino, piperidino, pyrrolidino, or morpholino and the other for piperidino, pyrrolidino, or morpholino. In these compounds the lower alkyl group is preferably a methyl group and anions are hydroxide and those of acids suitable for the formation of nontoxic and therapeutically useful salts, especially of hydrohalic acids such as hydriodic acid, alkyl sulfuric acids, alkane sulfonic acids, citric acid, phosphoric acid, succinic acid, oxalic acid, malic acid, tartaric acid, ascorbic acid and the like.

The new compounds are potent ganglionic blocking agents and can be used as medicaments both parenterally or enterally, for example, orally. As compared with the known quaternary compounds of β-diethylaminoethyl β-diethylaminopropionate, the compounds of the invention exhibit a more potent and prolonged action. Especially valuable are β-dimethylaminoethyl β-piperidino-α-methylpropionate dimethiodide of the formula

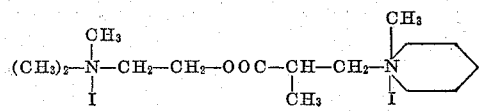

β-pyrrolidino-ethyl β-pyrrolidino-α-methylpropionate dimethiodide and β-dimethylaminoethyl β-piperidino-α-methylpropionate dimethiodide.

The compounds of the invention are made by esterifying a β-R-ethanol or a reactive derivative thereof, such as a metal alcoholate or reactive ester, with a β-R'-α-methylpropionic acid, or an α-methacrylic acid, or a reactive derivative thereof, such as an anhydride or halide or metal salt, in which formulae R and R' represent two quarternary ammonium groups, namely, R" and R''', the N-atom of one of which is part of a saturated monocyclic heterocyclic ring or is connected with two lower alkyl groups and the N-atom of the other of which is part of a saturated monocyclic heterocyclic ring, or represent radicals convertible into such quaternary ammonium groups, R" and R''', followed by converting an obtained acrylic acid ester into a propionic acid ester having in β-position the group Am', and by converting at any stage of the process into the quaternary ammonium groups R" and R''' any radicals being so convertible and present in the obtained compounds.

Substituents convertible into the quaternary ammonium groups R" and R''' are primarily tertiary amino groups which are so converted by quaternization, or reactive esterified hydroxy groups such as halogen atoms which preferably are so converted by exchanging with a tertiary amino group and quaternization. An acrylic acid ester is converted into a propionic acid ester containing in β-position the group Am' by reacting with a secondary amine, if desired in the presence of a condensing agent.

A preferred process consists in esterifying α-methacrylic acid especially in the form of one of its halides such as chloride with a β-Am-ethanol, reacting the obtained ester with an amine Am'H and quaternizing the obtained β-Am-ethyl β-Am'-α-methylpropionate.

Another modification of the process consists in esterifying a β-halogen-α-methylpropionic acid especially in the form of one of its halides, such as chloride, with a β-halogeno-ethanol, reacting the obtained ester with the heterocyclic amine Am'H and quaternizing the obtained di-tertiary amine.

As quaternizing agents there are used preferably reactive esters of strong organic or inorganic acids of lower alkanols, such as lower alkyl halides, especially iodides, or alkyl sulfates, alkane sulfonates and the like. From the quaternary salts the free bases as well as other salts may be made in the customary way, such as by treatment of the halides with silver oxide or appropriate silver salts or by using an anion exchanger. In turn, obtained bases may be converted into the desired salts by reaction with the appropriate acids.

The novel compounds can be made up into preparations suitable for enteral or parenteral administration, e.g. in the form of tablets, ampoules and other dosage unit forms. For this purposes any suitable pharmaceutical carrier or vehicle may be employed, e.g. water, gelatin, lactose, starch, magnesium stearate, talc, vegetable oils, benzyl alcohol, gums, polyalkylene glycols, petroleum jelly, cholesterol or other known carrier substances for medicaments.

The invention comprises also β-Am-ethyl β-Am'-α-methylpropionates wherein Am and Am' have the meanings given above and the salts thereof. These compounds are useful as intermediate products for the manufacture of the quaternary compounds, as can be seen from the above outlined processes.

The invention is illustrated more specifically in the examples which follow. In the examples parts by weight bear the same relation to parts by volume as do grams to milliliters. Temperatures are expressed in degrees centigrade.

Example 1

To a solution of 20.7 parts by weight of methacrylyl-chloride in 100 parts by volume of benzene there was added with stirring 23.0 parts by weight of β-pyrrolidine-ethanol over a 10-minute period. This mixture was refluxed for 3¾ hours and then chilled. The oily crystals were filtered and washed with benzene, then dissolved in water. This solution was made strongly alkaline with concentrated sodium hydroxide (1:1), and the oily base which separated was extracted with ether. The ether extract was dried with anhydrous magnesium sulfate, then filtered and distilled to remove solvent. The product was distilled, and the material going over at 75–88°

C./0.12 mm. was collected. This substance was treated with 5.8 parts by weight of pyrrolidine, and the mixture refluxed for 4 hours. The reaction product was distilled, boiling point 110–119° C./0.15 mm., $n_D^{24}=1.4823$. It represents β-pyrrolidino-ethyl β-pyrrolidino-α-methylpropionate.

3.3 parts by weight of this compound were mixed with 7.4 parts by weight of methyliodide in 15 parts by volume of anhydrous ethanol and then allowed to stand at room temperature for 3 hours. Addition of ether effected crystallization. After recrystallization from methanol, there was obtained β-pyrrolidino-ethyl β-pyrrolidino-α-methylpropionate dimethiodide, melting at 174.4–176.4° C.

*Example 2*

To a solution of 26.4 parts by volume of methacrylyl-chloride in 150 parts by volume of dry benzene, a solution of 30 parts by volume of β-diethylamino-ethanol in 100 parts by volume of dry benzene was added with stirring over a 25-minute period. After refluxing for 2 hours, the layers were separated and the lower oily layer was dissolved in water. The aqueous solution was made alkaline with concentrated sodium hydroxide solution and extracted with ether. After drying over anhydrous magnesium sulfate, the ether was removed and the product distilled under reduced pressure. The obtained β-diethylaminoethyl methacrylate was used immediately for the following reaction:

A mixture of 20 parts by weight of β-diethylaminoethyl methacrylate and 9.4 parts by weight of piperidine was refluxed for ½ hour. Upon distillation β-diethylaminoethyl β-piperidino-α-methylpropionate was obtained, boiling point 103–115° C./0.35 mm. Its dihydrochloride melts at 212–213° C. after crystallization from ethanol.

2.5 parts by weight of the base were dissolved in 10 parts by volume of acetone and brought to boiling. A solution of 3.9 parts by weight of methyliodide in 5 parts by volume of acetone was added slowly, followed by refluxing for 10 minutes, then the mixture was chilled and diluted with ether. The crystals which formed were filtered, washed with anhydrous ethanol and ether and then vacuum dried. The thus obtained β-diethylaminoethyl β-piperidino-α-methylpropionate dimethiodide melts at 159° C.

*Example 3*

To a solution of 26.4 parts by volume of methacrylyl-chloride in 150 parts by volume of dry benzene a solution of 23 parts by volume of β-dimethylamino-ethanol in 100 parts by volume of dry benzene was added with stirring over a 25-minute period. After refluxing for 2 hours the layers were separated and the lower oily layer dissolved in water. The aqueous solution was made alkaline with concentrated sodium hydroxide solution and extracted with ether. After drying over anhydrous magnesium sulfate, the ether was removed and the product distilled under reduced pressure. The obtained β-dimethylaminoethyl methacrylate was used immediately for the following reaction:

A mixture of 20 parts by weight of β-dimethylaminoethyl methacrylate and 11.1 parts by weight of piperidine was heated under reflux for 1 hour. Upon distillation β-dimethylaminoethyl β-piperidino-α-methylpropionate was obtained boiling point 91–99° C./0.1 mm.

$n_D^{22.2}=1.4591$

Its dihydrochloride, after crystallization from ethanol, melts at 223–224° C.

5.0 parts by weight of the base in 15 parts by volume of acetone were brought to boiling and treated with 8.9 parts by weight of methyliodide in 10 parts by volume of acetone. The mixture was refluxed for 10 minutes and then cooled, leaving a dark red oil which crystallized on trituration with ethanol. After drying at 55° C. in vacuo, the sesquihydrate of β-dimethylaminoethyl β-piperidino-α-methylpropionate dimethiodide melts at 103–107° C. (with decomposition). The melting point of the anhydrous substance is 168° C.

*Example 4*

A solution of 14.8 parts by weight of β-chloroethyl methacrylate and 27 parts by weight of piperidine in 50 parts by volume of toluene was refluxed for 2½ hours. The salt which separated (piperidine hydrochloride) was filtered off. The toluene solution was extracted with about 10 percent hydrochloric acid solution. This extract was made strongly basic with 50 percent sodium hydroxide solution, sufficient being added to effect separation of the oily base. The base was extracted with 3 portions of ether (250 parts by volume total) and the extract was washed once with water. The extract, upon drying over anhydrous MgSO₄, was filtered and distilled to remove the solvent. The oily residue was fractionated. The fraction boiling at 119–132° C. at 0.15 mm. Hg ($n_D^{26}=1.4759$) and representing the β-piperidino-ethyl β-piperidino-α-methylpropionate, was dissolved in 15 parts by volume of anhydrous alcohol and treated with a solution of 10 parts by volume of methyliodide in 5 parts by volume of alcohol. An oily layer separated on standing for 2 hours at room temperature. Upon warming on a steam bath a crystalline precipitate separated out, which, after recrystallization from 95 percent ethanol, melts at 187–188° C. It represents the β-piperidino-ethyl β-piperidino-α-methylpropionate dimethiodide.

*Example 5*

A solution of 10 parts by weight of β-dimethylaminoethyl methacrylate and 5.4 parts by weight of pyrrolidine in 25 parts by volume of benzene was refluxed for three hours. The solvent was removed and the product distilled, boiling point 70–98° C./0.10 mm., $n_D^{25}=1.4532$. The thus obtained β-dimethylaminoethyl β-pyrrolidino-α-methylpropionate was dissolved in 15 parts by volume of alcohol and treated with 26.4 parts by weight of methyliodide. The thus obtained crystalline product, M.P. 118° C. (dec.) melts upon recrystallization from 95 percent alcohol at 122.5–123° C. It represents β-dimethylaminoethyl β-pyrrolidino-α-methylpropionate dimethiodide.

What is claimed is:

1. β-Dimethylaminoethyl β-piperidino-α-methylpropionate dimethiodide.
2. β-Pyrrolidinoethyl β-pyrrolidino-α-methylpropionate dimethiodide.
3. β-Dimethylaminoethyl β-pyrrolidino-α-methylpropionate dimethiodide.
4. β-Piperidinoethyl β-piperidino-α-methylpropionate dimethiodide.
5. β-Diethylaminoethyl β-pyrrolidino-α-methylpropionate dimethiodide.
6. A bisquaternary ammonium compound of the formula

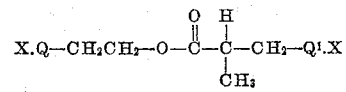

wherein X is a non-toxic therapeutically useful acid anion and one of the groups Q and Q¹ is a member of the group consisting of N-lower alkyl-1-pyrrolidinium, N-lower alkyl-1-piperidinium, and N-lower alkyl-4-morpholinium and the other is a member of the group consisting of tri-lower alkyl ammonium, N-lower alkyl-1-pyrrolidinium, N-lower alkyl-1-piperidinium, and N-lower alkyl-4-morpholinium.

(References on following page)

References Cited in the file of this patent

UNITED STATES PATENTS

| | | |
|---|---|---|
| 2,033,740 | Rider | Mar. 10, 1936 |
| 2,408,893 | Swan et al. | Oct. 8, 1946 |
| 2,460,139 | Marks et al. | Jan. 25, 1949 |
| 2,683,167 | Girod et al. | July 6, 1954 |

OTHER REFERENCES

Gazz. Chim. Ital., vol. 79, pp. 129–41 (1949), abstracted in C. A., vol. 44, p. 1031e.

Fusco: Gazzeta chimica italiana, vol. 79, pp. 836–48 (1949).

Fusco: Chem. Abst., vol. 47, cols. 6865–66 (1953).

Schueler: Science, vol. 113, pp. 512–514 (1951).

Sekera et al.: Chemicke Listy, vol. 46, pp. 762–65 (1952), abstracted in Chem. Abst., vol. 47, col. 12302(h).

UNITED STATES PATENT OFFICE
CERTIFICATE OF CORRECTION

Patent No. 2,934,538                      April 26, 1960

Renat H. Mizzoni

It is hereby certified that error appears in the printed specification of the above numbered patent requiring correction and that the said Letters Patent should read as corrected below.

Column 1, line 61, for "β-dimethylaminoethyl" read -- β-diethylaminoethyl --.

Signed and sealed this 10th day of January 1961.

(SEAL)
Attest:
KARL H. AXLINE
Attesting Officer

ROBERT C. WATSON
Commissioner of Patents